(12) United States Patent
Roberge et al.

(10) Patent No.: US 12,446,492 B2
(45) Date of Patent: Oct. 21, 2025

(54) SYSTEM AND METHOD FOR WRAPPING AN AGRICULTURAL BALE

(71) Applicants: CNH Industrial Canada, Ltd., Saskatoon (CA); CNH Industrial America LLC, New Holland, PA (US)

(72) Inventors: Martin J. Roberge, Quebec (CA); Jonathan E. Ricketts, Coal Valley, IL (US)

(73) Assignees: CNH Industrial Canada, Ltd., Saskatoon (CA); CNH Industrial America LLC, New Holland, PA (US)

( * ) Notice: Subject to any disclaimer, the term of this patent is extended or adjusted under 35 U.S.C. 154(b) by 16 days.

(21) Appl. No.: 18/636,083

(22) Filed: Apr. 15, 2024

(65) Prior Publication Data

US 2024/0341241 A1    Oct. 17, 2024

Related U.S. Application Data

(60) Provisional application No. 63/459,368, filed on Apr. 14, 2023.

(51) Int. Cl.
*A01F 15/07* (2006.01)

(52) U.S. Cl.
CPC .. *A01F 15/0715* (2013.01); *A01F 2015/0745* (2013.01)

(58) Field of Classification Search
CPC .............. A01F 15/0715; A01F 2015/0745
See application file for complete search history.

(56) References Cited

U.S. PATENT DOCUMENTS

| | | |
|---|---|---|
| 3,674,139 A | 7/1972 | Manasian |
| 4,917,008 A | 4/1990 | Van Den Wildenberg |
| 5,215,191 A | 6/1993 | Wright |
| 9,475,598 B2 | 10/2016 | Roberge |
| 2022/0248609 A1 | 8/2022 | Roberge |
| 2022/0256773 A1 | 8/2022 | Ricketts |
| 2022/0272904 A1 | 9/2022 | Roberge |

FOREIGN PATENT DOCUMENTS

| | | |
|---|---|---|
| DE | 19833554 A1 | 1/1999 |
| EP | 1321028 B1 | 1/2008 |

*Primary Examiner* — Daniel Jeremy Leeds
(74) *Attorney, Agent, or Firm* — Fletcher Yoder, P.C.

(57) ABSTRACT

A bale wrap for an agricultural bale includes a wrapping layer having a center section, a first shoulder section, and a second shoulder section. The first shoulder section extends laterally outwardly from a first lateral side of the center section, the second shoulder section extends laterally outwardly from a second lateral side of the center section, the center section is configured to cover a circumferential side of the agricultural bale, the first shoulder section is configured to cover at least 5 percent of a first axial side of the agricultural bale, the second shoulder section is configured to cover at least 5 percent of a second axial side of the agricultural bale, and a center stretchability of the center section with respect to a longitudinal extent of the wrapping layer is greater than a shoulder stretchability of the first and second shoulder sections with respect to the longitudinal extent of the wrapping layer.

20 Claims, 3 Drawing Sheets

SYSTEM AND METHOD FOR WRAPPING AN AGRICULTURAL BALE

BACKGROUND

The present disclosure relates generally to a system and method for wrapping an agricultural bale.

Agricultural balers are used to compress an agricultural product (e.g., cotton) into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale. The bale wrap may be formed from a natural material, such as cotton or hemp. As a result, the bale wrap may biodegrade after use or be shredded during bale processing, thereby reducing waste.

BRIEF DESCRIPTION

In certain embodiments, a bale wrap for an agricultural bale includes a wrapping layer having a center section, a first shoulder section, and a second shoulder section. The first shoulder section extends laterally outwardly from a first lateral side of the center section, the second shoulder section extends laterally outwardly from a second lateral side of the center section, the center section is configured to cover a circumferential side of the agricultural bale, the first shoulder section is configured to cover at least 5 percent of a first axial side of the agricultural bale, the second shoulder section is configured to cover at least 5 percent of a second axial side of the agricultural bale, and a center stretchability of the center section with respect to a longitudinal extent of the wrapping layer is greater than a shoulder stretchability of the first and second shoulder sections with respect to the longitudinal extent of the wrapping layer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
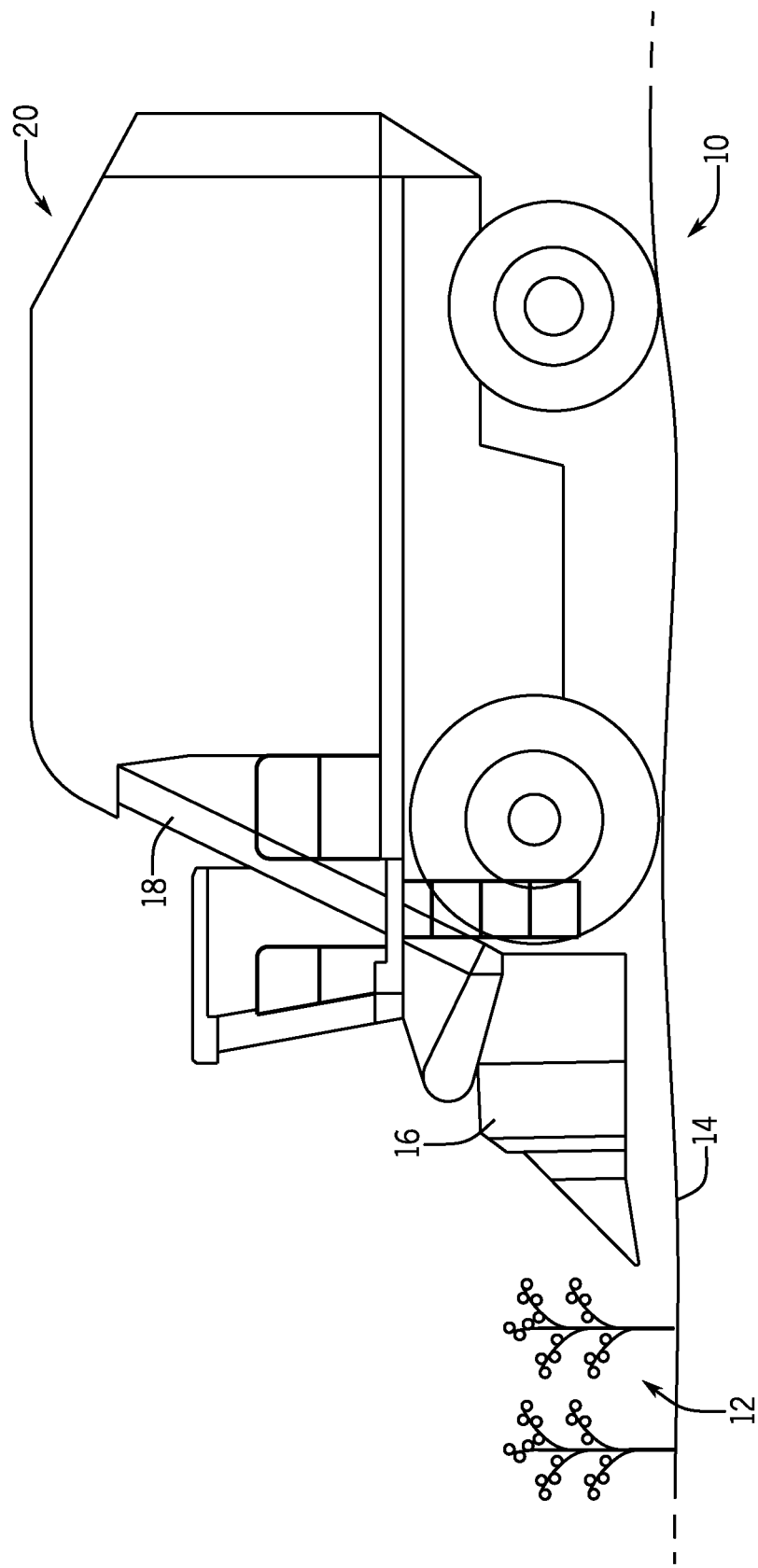
FIG. 1 is a side view of an embodiment of an agricultural system having a bale wrapping system.

FIG. 1 is a side view of an embodiment of an agricultural system 10 (e.g., harvester) having a bale wrapping system. The agricultural system 10 is configured to harvest agricultural product 12 (e.g., cotton) from a field 14 and to form the agricultural product 12 into bales (e.g., agricultural bales). For example, the agricultural system 10 includes a header 16 having drums configured to harvest the agricultural product 12 from the field 14. Additionally, the agricultural system 10 includes an air-assisted conveying system 18 configured to move the agricultural product 12 from the drums of the header 16 to a baler 20. The baler 20 is supported by and/or mounted within or on a chassis of the agricultural system 10. As discussed in detail below, the baler 20 may form the agricultural product 12 into round bales. However, in other embodiments, the baler 20 of the agricultural system 10 may form the agricultural product into square bales, polygonal bales, or bales of other suitable shape(s). As described in greater detail below, after forming the agricultural product 12 into a bale, the bale wrapping system of the agricultural system 10 wraps the bale with a bale wrap to secure the agricultural product 12 within the bale and to generally maintain a shape of the bale.

As discussed in detail below, the bale wrapping system is configured to wrap the bale with a bale wrap having one or more layers. In certain embodiments, the bale wrap includes a wrapping layer having a center section, a first shoulder section, and a second shoulder section. The first shoulder section extends laterally outwardly from a first lateral side of the center section, and the second shoulder section extends laterally outwardly from a second lateral side of the center section. Accordingly, the center section is positioned between the first and second shoulder sections with respect to a lateral extent of the wrapping layer. Furthermore, the center section is configured to cover a circumferential side of the bale, the first shoulder section is configured to cover at least 5 percent of a first axial side of the bale, and the second shoulder section is configured to cover at least 5 percent of a second axial side of the bale. Accordingly, after the bale is wrapped with the wrapping layer, the bale wrap covers an entirety of the circumferential side of the bale and at least a portion of each axial side of the bale, thereby enhancing the effectiveness of the bale wrap in maintaining the shape of the bale and providing the bale with enhanced protection from the environment (e.g., as compared to a bale wrap that only covers the circumferential side of the bale).

In addition, as discussed in detail below, a center stretchability of the center section with respect to a longitudinal extent of the wrapping layer is greater than a shoulder stretchability of the first and second shoulder sections with respect to the longitudinal extent of the wrapping layer. Accordingly, as the wrapping layer is disposed about the bale, wrinkling of the shoulder sections may be reduced (e.g., as compared to a wrapping layer having uniform stretchability), thereby further enhancing the effectiveness of the bale wrap in maintaining the shape of the bale and providing the bale with enhanced protection from the environment. For example, during the bale wrapping process, the center section may be stretched by the bale wrapping system as the bale wrap is disposed about the bale. However, due to the lower stretchability of the shoulder sections, the shoulder sections may naturally contract about the axial sides of the bale, thereby reducing wrinkling of the shoulder sections. As a result, the shoulder sections may effectively engage the axial sides of the bale, thereby effectively maintaining the shape of the bale and blocking material (e.g., dust, water, etc.) from engaging at least a portion of the axial sides of the bale.

Figure 2:
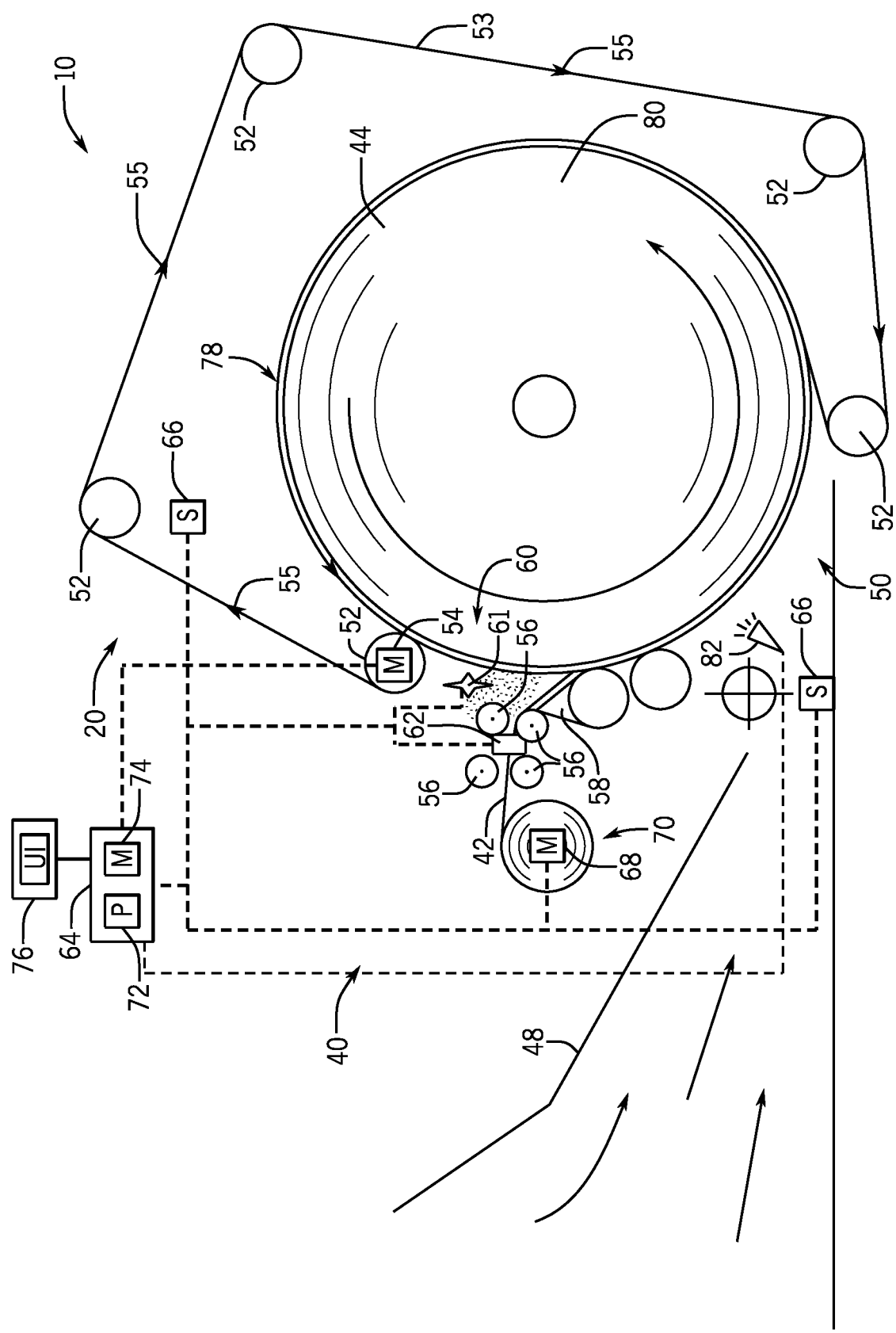
FIG. 2 is a schematic diagram of an embodiment of a bale wrapping system that may be employed within the agricultural system of FIG. 1.

FIG. 2 is a schematic diagram of an embodiment of a bale wrapping system 40 that may be employed within the agricultural system 10 of FIG. 1. A bale wrap 42 is configured to wrap around a bale 44 (e.g., a bale of the agricultural product, an agricultural bale, etc.) formed by the baler 20 of the agricultural system 10. As cotton or another agricultural product is harvested, the agricultural product flows into an accumulator 48 (e.g., bale chamber) and/or a feeding system. For example, cotton may be blown by the air-assisted conveying system into the accumulator/bale chamber 48. The cotton is then fed into a cavity 50 of the baler 20. The baler 20 includes multiple rollers 52 that support and/or drive rotation of one or more belts 53. For example, one or more rollers 52 engage the belt(s) 53, which enable the belt(s) 53 to move along the pathway defined by the rollers 52 and the bale 44. One or more rollers are driven to rotate via a belt drive system 54 (e.g., including electric motor(s), hydraulic motor(s), pneumatic motor(s), etc.). The belt(s) 53 circulate around the path defined by the rollers 52 and the bale 44, as indicated by arrows 55. Movement of the belt(s) 53 captures agricultural product from the accumulator 48 and draws the agricultural product into the cavity 50, where the agricultural product is gradually built up to form the bale 44. As the agricultural product builds within the cavity 50, one or more of the rollers 52 may move radially outward to accommodate the increasing size of the bale 44.

Once the bale 44 reaches a desired size, the bale wrapping system 40 wraps the bale 44 with the bale wrap 42. The bale wrap 42 may include cotton, hemp, flax, other suitable material(s) (e.g., biodegradable material(s), natural material(s)), or a combination thereof. In certain embodiments, the bale wrap 42 may include only cotton. Additionally, the bale wrap 42 may include canvas, fabric, cloth, other suitable material(s), or a combination thereof.

The bale wrap 42 is fed into contact with the bale 44 with one or more feed rollers 56 and over a wrap guide or wrap applicator 58 (e.g., duckbill). The wrap guide/wrap applicator 58 is configured to move (e.g., rotate) to direct the bale wrap 42 into contact with the bale 44. The bale wrap 42 is captured between the bale 44 and the belt(s) 53. Accordingly, rotation of the bale 44 draws the bale wrap 42 around the bale 44, thereby wrapping the bale 44.

To secure the bale wrap 42 around the bale 44, the bale wrapping system 40 includes an adhesive system 60. The adhesive system 60 includes one or more sprayers 61 that spray an adhesive onto the bale wrap 42 (e.g., one side of the bale wrap 42). Additionally or alternatively, the sprayer(s) may spray an activator (e.g., water) onto the bale wrap 42 to activate an adhesive (e.g., water-soluble film, powder embedded within the bale wrap, etc.). Accordingly, the adhesive system 60 may create an adhesive layer on the bale wrap 42, thereby coupling the bale wrap 42 to itself, which secures the bale wrap 42 around the bale 44. For example, a first portion of the bale wrap 42 couples (e.g., adheres) to a second portion (e.g., a backside and/or an exterior surface) of the bale wrap 42 with the adhesive provided by and/or activated by the adhesive system 60 as the first portion overlaps the second portion. The bale wrap 42 is then cut with a cutter or cutting system 62 to separate additional bale wrap 42 (e.g., on a shaft of a bale wrap assembly) from the bale wrap 42 surrounding the bale 44.

The cutting system 62 is configured to cut the bale wrap 42 to a suitable length for wrapping the bale 44. For example, the length of the bale wrap 42 may be selected based on a size of the bale 44 and a desired number of wraps of the bale wrap 42 (e.g., the number of times the bale wrap 42 wraps around a circumferential side of the bale 44). The cutting system 62 may include a cutting mechanism, an actuation assembly coupled to the cutting mechanism, and a track. The cutting mechanism may include a knife that engages the bale wrap 42 to cut the bale wrap 42. In other embodiments, the cutting mechanism may include other suitable mechanism(s) configured to cut the bale wrap (e.g., a rotary knife, a duckbill knife, a saw, a shear bar, etc.). In some embodiments, the actuation assembly is configured to move the cutting mechanism along a track to selectively drive the cutting mechanism into engagement with the bale wrap 42. In certain embodiments, the bale wrap 42 may have partially pre-cut sections (e.g., perforated sections) to facilitate cutting the bale wrap 42 by the cutting system 62.

The bale wrap 42 is configured to wrap around the bale 44 to secure the agricultural product within the bale 44 and to generally maintain a shape of the bale 44, such as the round shape in the illustrated embodiment. In other embodiments, the shape of the bale may be rectangular, polygonal, or another suitable shape. The bale wrapping system 40 may wrap the bale 44 with the bale wrap 42 once or multiple times. For example, the bale wrap 42 may form one wrap (e.g., layer), one wrap and a portion of another wrap, two wraps, or five wraps around the bale 44. The adhesive system 60 may spray various circumferential lengths of adhesive/activator along the bale wrap 42. For example, the adhesive system 60 may spray along a circumferential portion of the bale wrap 42 that extends less than 25 percent, 50 percent, 75 percent, or 100 percent of the circumferential extent of the bale 44. The sprayed portion of the bale wrap 42 may also cover more than one wrap of the bale wrap 42. In some embodiments, the portion of the bale wrap 42 sprayed with the adhesive/activator may be a selected length (e.g., 1 cm, 15 cm, 30 cm, 60 cm, 90 cm, 120 cm, 150 cm, or more).

In certain embodiments, the agricultural system 10 includes a controller 64. The controller 64 may be configured to control rotation of the belt(s) 53 and/or a belt speed of the belt(s) 53. For example, in the illustrated embodiment, the controller 64 is communicatively coupled to the belt drive system 54, and the controller 64 is configured to control a rotation rate of one or more wheels or rollers 52 to control the belt speed of the belt(s) 53. The controller 64 may control the belt speed of the belt(s) 52 in response to feedback from one or more sensors 66. The sensor(s) 66 are communicatively coupled to the controller 64, and the sensor(s) 66 are configured to output sensor signal(s) indicative of a flow rate of agricultural material, size of the bale 44, other suitable parameter(s), or a combination thereof.

In addition, the sensor(s) 66 may enable the controller 64 to determine when to apply adhesive/activator to the bale wrap 42. In some embodiments, upon determining the bale 44 has reached a desired size (e.g., based on feedback from the sensor(s) 66), the controller 64 may automatically activate a bale wrapping process. For example, the controller 64 may receive signal(s) from the sensor(s) 66 indicative of the size of the bale 44 (e.g., weight, diameter, circumference, etc.). Upon determining the bale 44 has reached a target size, the controller 64 may activate the bale wrapping system 40 to initiate the bale wrapping process. For example, in the illustrated embodiment, the controller 64 is communicatively coupled to a bale wrap shaft drive system 68 (e.g., including electric motor(s), hydraulic motor(s), pneumatic motor(s), etc.), which is coupled to a shaft of a bale wrap assembly 70 and configured to drive the shaft to rotate. The bale wrap assembly 70 includes the shaft and the bale wrap 42 disposed about the shaft. The controller 64 may activate the bale wrap shaft drive system 68 to begin feeding the bale wrap 42 toward the bale 44. In some embodiments, the wrap guide 58 (e.g., duckbill) may be actuated (e.g., rotated), which drives the bale wrap 42 into contact with the bale 44. As previously discussed, the bale wrap 42 is captured between the bale 44 and the belt(s) 53. Accordingly, rotation of the belt(s) 53 draws the bale wrap 42 around the bale 44.

The controller 64 may then determine the extent (e.g., length) of the bale wrap 42 around the bale 44 based on feedback from the sensor(s) 66. Once a target amount of wrapping is complete, the controller 64, which is communicatively coupled to the adhesive system 60, may activate the adhesive system 60. The controller 64 may then control the amount of adhesive/activator sprayed onto the bale wrap 42 and/or how much of the bale wrap 42 is sprayed with adhesive/activator (e.g., circumferential extent of the bale wrap 42 that is sprayed with adhesive/activator). In some embodiments, depending on the size of the bale 44, the controller 64 may control the adhesive system 60 to spray more or less adhesive/activator onto the bale wrap 42 and/or control how much of the bale wrap 42 is sprayed with adhesive/activator. For example, if the bale 44 is small, less adhesive/activator may be used and/or less bale wrap 42 may be sprayed with adhesive/activator. However, if the bale 44 is large, more adhesive/activator may be sprayed onto the bale wrap 42 and/or more of the bale wrap 42 may be sprayed with adhesive/activator.

The controller 64 is configured to control movement and operation of the cutting system 62 as well. For example, the controller 64, which is communicatively coupled to the cutting system 62, may control engagement of a cutting mechanism of the cutting system 62 with the bale wrap 42, such that the cutting mechanism cuts the bale wrap 42. As illustrated, the cutting system 62 is positioned upstream of the sprayer(s) 61 of the adhesive system 60 relative to the direction of movement of the bale wrap 42. Once the bale wrap 42 is cut and the bale wrap shaft drive system 68 terminates rotation of the shaft of the bale wrap assembly 70, the bale wrap 42 continues to rotate with the bale 44, thereby enabling a portion of the bale wrap 42 with adhesive/activated adhesive to contact and adhere to another portion of the bale wrap 42 that is disposed about the bale 44.

In certain embodiments, the controller 64 may control the adhesive system 60, the cutting system 62, the bale wrap shaft drive system 68, and the belt drive system 54 to control the bale wrapping process. For example, in response to the controller 64 determining that the bale 44 is in condition for wrapping, the controller 64 may control the belt drive system 54 to control the belt speed of the belt(s) 53, such that the belt(s) 53 reach a target belt speed for wrapping the bale 44. The target belt speed for wrapping the bale may be greater than or less than a target belt speed for bale formation. In certain embodiments, the belt speed may not be adjusted for wrapping the bale 44 (e.g., the target belt speed for wrapping the bale may be equal to the target belt speed for bale formation). The controller 64 may determine that the bale 44 is in condition for wrapping based on a weight of the bale 44 (e.g., based on feedback from the sensor(s) 66), a duration of the bale forming process, instructions from another controller (e.g., a harvester controller) to wrap the bale 44, based on a size of the bale 44 (e.g., based on feedback from the sensor(s) 66), other suitable parameter(s), or a combination thereof. In response to determining the bale is in condition for wrapping, the controller 64 may control the bale wrap shaft drive system 68 to feed the bale wrap 42 toward the bale 44. The controller 64 may then output a signal to actuate the adhesive system 60. Concurrently or a selected duration thereafter, the controller 64 may output a signal to the cutting system 62 to drive the cutting mechanism into engagement with the bale wrap 42, thereby cutting the bale wrap 42. Thereafter, the controller 64 may control the belt drive system 54 to stop rotation of the belt(s) 53. The wrapped bale 44 may then be ejected from the agricultural system 10.

In the illustrated embodiment, the controller 64 of the bale wrapping system 40 includes a processor 72 and a memory 74. The processor 72 (e.g., a microprocessor) may be used to execute software, such as software stored in the memory 74 for controlling the bale wrapping system 40 (e.g., for controlling rotation of the bale 44, the adhesive system 60, the cutting system 62, etc.). Moreover, the processor 72 may include multiple microprocessors, one or more "general-purpose" microprocessors, one or more special-purpose microprocessors, and/or one or more application specific integrated circuits (ASICS), or some combination thereof. For example, the processor 72 may include one or more reduced instruction set (RISC) or complex instruction set (CISC) processors.

The memory 74 may include a volatile memory, such as random-access memory (RAM), and/or a nonvolatile memory, such as read-only memory (ROM). The memory 74 may store a variety of information and may be used for various purposes. For example, the memory 74 may store processor-executable instructions (e.g., firmware or software) for the processor 72 to execute, such as instructions for controlling the bale wrapping system 40. In certain embodiments, the controller 64 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the bale wrapping system 40), and any other suitable data. The processor 72 and/or the memory 74, and/or an additional processor and/or memory device, may be located in any suitable portion of the agricultural system 10.

Additionally, the bale wrapping system 40 includes a user interface 76 communicatively coupled to the controller 64. The user interface 76 may be configured to provide information to an operator (e.g., indicative of the rotation rate of the bale 44, the belt speed of the belt(s) 53, an amount of the bale wrap 42 remaining on the bale wrap assembly 70, a size of the bale 44, an amount of adhesive/activator remaining, other suitable parameter(s), or a combination thereof). Additionally, the user interface 76 may be configured to enable operator interactions with the bale wrapping system 40, such as control of the adhesive system 60, control of the cutting system 62, control of the belt(s) 53, control of other parameter(s), or a combination thereof. For example, the user interface 76 may include a display and/or other user interaction device(s) (e.g., button(s)) configured to enable operator interactions.

In certain embodiments, the bale wrap 42 includes a wrapping layer having a center section, a first shoulder section, and a second shoulder section. The first shoulder section extends laterally outwardly from a first lateral side of the center section, and the second shoulder section extends laterally outwardly from a second lateral side of the center section. The center section is configured to cover a circumferential side 78 of the bale 44, the first shoulder section is configured to cover at least 5 percent of a first axial side 80 of the bale 44, and the second shoulder section is configured to cover at least 5 percent of a second axial side of the bale 44. As used herein, "circumferential side" of the bale 44 refers to the outer side of the bale that extends along the direction of rotation of the bale 44, as compared to the axial sides of the bale. A bale having any suitable shape (e.g., square, polygonal, etc.) has a circumferential side that extends along the direction of rotation of the bale. A center stretchability of the center section with respect to a longitudinal extent of the wrapping layer (e.g., extent of the wrapping layer along the direction the wrapping layer extends about the circumferential side 78 of the bale 44) is greater than a shoulder stretchability of the first and second shoulder sections with respect to the longitudinal extent of the wrapping layer. Accordingly, as the wrapping layer, which is part of the bale wrap 42, is disposed about the bale 44, wrinkling of the shoulder sections may be reduced (e.g., as compared to a wrapping layer having uniform stretchability), thereby further enhancing the effectiveness of the bale wrap in maintaining the shape of the bale and providing the bale with enhanced protection from the environment.

In certain embodiments, during the bale wrapping process, the center section may be stretched by the bale wrapping system 40 as the bale wrap 42 is disposed about the bale 44. To stretch the center section of the wrapping layer during the bale wrapping process, the controller 64 may control the belt drive system 54 to control the belt speed of the belt(s) 53, and the controller 64 may control the bale wrap shaft drive system 68 to control a roll speed of the shaft of the bale wrap assembly 70. For example, the controller 64 may control the belt speed to pull the bale wrap 42 from the bale wrap assembly 70 at a higher speed than the roll speed. As a result, the center section of the wrapping layer of the bale wrap 42 stretches. However, due to the lower stretchability of the shoulder sections, the shoulder sections may naturally contract about the axial sides of the bale, thereby reducing wrinkling of the shoulder sections. As a result, the shoulder sections may effectively engage the axial sides of the bale, thereby effectively maintaining the shape of the bale and blocking material (e.g., dust, water, etc.) from engaging at least a portion of the axial sides of the bale.

The controller 64 may control the belt speed of the belt(s) 53 and the roll speed of the shaft of the bale wrap assembly 70 to stretch the center section of the wrapping layer by any suitable percentage (e.g., within the stretching capability of the center section of the wrapping layer). For example, the bale wrapping system 40 may stretch the center section of the wrapping layer 5 percent, 10 percent, 15 percent, 20 percent, or more. Furthermore, in certain embodiments, the controller 64 may vary the amount of stretch during the bale wrapping process. For example, the controller 64 may control the belt speed of the belt(s) 53 and the roll speed of the shaft of the bale wrap assembly 70 to progressively increase the amount of stretch of the center section of the wrapping layer as the bale 44 is wrapped with the bale wrap 42. For example, the controller 64 may increase the amount of stretch (e.g., linearly, parabolically, exponentially, etc.) from a minimum stretch (e.g., 0 percent) to a maximum stretch (e.g., 5 percent, 10 percent, 15 percent, 20 percent, etc.). Alternatively, the controller 64 may control the belt speed of the belt(s) 53 and the roll speed of the shaft of the bale wrap assembly 70 to progressively decrease the amount of stretch of the center section of the wrapping layer as the bale 44 is wrapped with the bale wrap 42. For example, the controller 64 may decrease the amount of stretch (e.g., linearly, parabolically, exponentially, etc.) from a maximum stretch (e.g., 5 percent, 10 percent, 15 percent, 20 percent, etc.) to a minimum stretch (e.g., 0 percent). Furthermore, the controller 64 may control the belt speed of the belt(s) 53 and the roll speed of the shaft of the bale wrap assembly 70 to alternately increase/decrease the amount of stretch of the center section of the wrapping layer as the bale 44 is wrapped with the bale wrap 42.

While controlling the belt speed of the belt(s) 53 and the roll speed of the shaft of the bale wrap assembly 70 to control the stretching of the center section of the wrapping layer is disclosed above, in certain embodiments, the controller may only control the belt speed of the belt(s) or the roll speed of the shaft of the bale wrap assembly. Furthermore, in certain embodiments, the controller may control a braking system (e.g., alone or in combination with the belt speed of the belt(s) and/or the roll speed of the shaft of the bale wrap assembly) to control the stretching of the center section of the wrapping layer. For example, the braking system may reduce the speed of the bale wrap upstream of the belt(s), thereby stretching the center section of the wrapping layer. In certain embodiments, the braking system is configured to reduce the rotational speed of the shaft of the bale wrap assembly and/or the rotational speed of the feed rollers. Furthermore, in certain embodiments, the braking system may control application of force of a braking element (e.g., a brake, the wrap guide/applicator, etc.) against the bale wrap.

In the illustrated embodiment, the bale wrapping system 40 includes a fluid applicator 82 configured to apply a fluid treatment (e.g., soya wax, cotton wax, sea weed, biodegradable plastic) or a fluid activator (e.g., water) to the wrapping layer after the bale wrap 42 is disposed about the bale 44. The fluid applicator 82 may include any suitable device(s) configured to apply the fluid treatment/activator, such as a spray nozzle, a liquid application nozzle, an atomizer, a pump, other suitable device(s), or a combination thereof. The fluid treatment is configured to block water penetration into the bale 44, thereby substantially protecting the bale 44 from environmental moisture (e.g., rain, dew, etc.). Furthermore, the fluid activator is configured to activate a particulate treatment within the wrapping layer. The activated particulate treatment is configured to block water penetration into the bale 44, thereby substantially protecting the bale 44 from environmental moisture (e.g., rain, dew, etc.).

In certain embodiments, the fluid applicator 82 may applied the fluid treatment/activator across an entire lateral extent of the wrapping layer (e.g., width of the wrapping layer) before the shoulder sections contract about the axial sides of the bale 44. Accordingly, the circumferential side 78 of the bale 44 and at least a portion of each axial side of the bale 44 may be substantially protected from environmental moisture. In certain embodiments, the fluid applicator 82 is communicatively coupled to the controller 64, and the controller 64 is configured to activate the fluid applicator 82 during the bale wrapping process. For example, the controller may activate the fluid applicator during the entire bale wrapping process, such that each wrap of the wrapping layer receives the fluid treatment/activator, or the controller may activate the fluid application during the last wrap, such that only the outer wrap of the wrapping layer receives the fluid treatment/activator. While the fluid applicator 82 is positioned at the accumulator/housing 48 in the illustrated embodiment, in other embodiments, the fluid applicator may be positioned at a bale storage section of the baler, and the fluid treatment/activator may be applied after the bale is wrapped and moved to the storage section. In addition, in certain embodiments, the sprayer(s) 61 of the adhesive system 60 may function as the fluid applicator 82 and apply the fluid treatment/fluid activator to the wrapping layer of the bale wrap. Furthermore, in certain embodiments, the fluid treatment/activator may not be applied to the wrapping layer. In such embodiments, the fluid applicator may be omitted. For example, in embodiments in which the bale wrap 42 includes the particulate treatment within the wrapping layer, the particulate treatment may be activated by environmental moisture/water (e.g., from rain, dew, etc.), thereby substantially protecting the bale 44 from the environmental moisture/water.

In certain embodiments, the bale wrap 42 may be formed from a single layer, such as the wrapping layer disclosed above. However, in other embodiments, the bale wrap 42 may be formed from multiple layers (e.g., coupled to one another). For example, in certain embodiments, the bale wrap 42 may include a wrapping layer and a water-resistant membrane coupled to the wrapping layer. The water-resistant membrane may be positioned on an outer surface of the wrapping layer, such that the wrapping layer contacts the bale. The water-resistant membrane is configured to block water penetration into the bale 44, thereby substantially protecting the bale 44 from the environmental moisture (e.g., rain, etc.). For example, the water-resistant membrane may be formed from an organic water-resistant material, a wax-coated material, a biodegradable plastic, etc. In certain embodiments, the bale wrap includes a second wrapping layer coupled to the water-resistant membrane (e.g., positioned on an outer surface of the water-resistant membrane, such that the water-resistant membrane is disposed between the wrapping layers). The second wrapping layer may have the same structure as the wrapping layer disclosed above (e.g., a center section with a higher longitudinal stretchability than the shoulder sections), the second wrapping layer may have a substantially uniform structure (e.g., the center section and the shoulder sections may have the same longitudinal stretchability), or the second wrapping layer may have another suitable structure.

Figure 3:
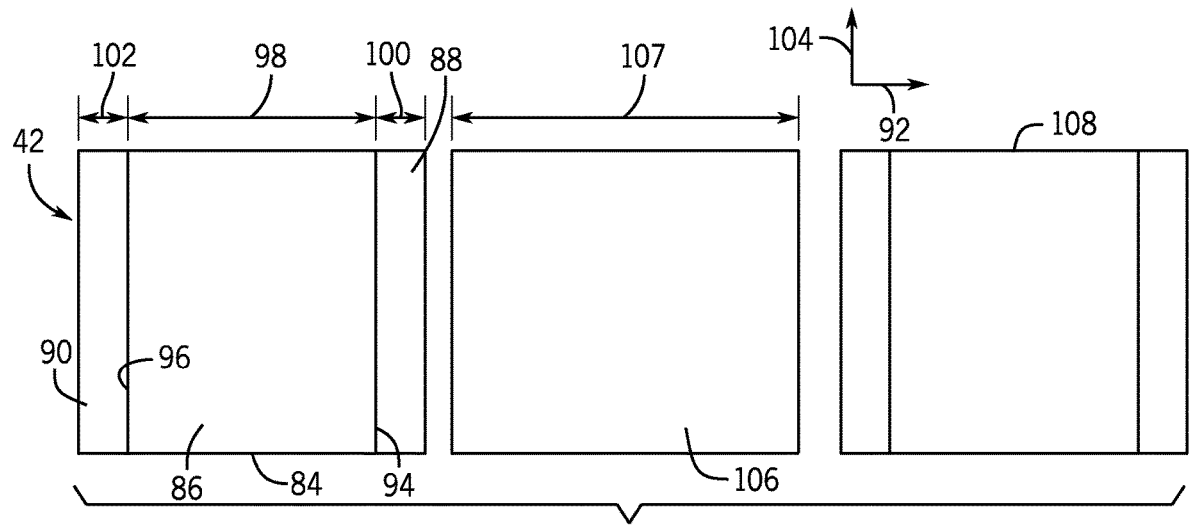
FIG. 3 is an exploded view of an embodiment of a bale wrap that may be used by the bale wrapping system of FIG. 2.

FIG. 3 is an exploded view of an embodiment of a bale wrap 42 that may be used by the bale wrapping system of FIG. 2. In the illustrated embodiment, the bale wrap 42 includes a wrapping layer 84. As previously discussed, the wrapping layer 84 has a center section 86, a first shoulder section 88, and a second shoulder section 90. The first shoulder section 88 extends laterally outwardly (e.g., outwardly with respect to a lateral axis 92) from a first lateral side 94 of the center section 86, and the second shoulder section 90 extends laterally outwardly (e.g., outwardly with respect to the lateral axis 92) from a second lateral side 96 of the center section 86. As previously discussed, the center section 86 is configured to cover the circumferential side of the bale. For example, the axial extent (e.g., width) of the bale may be about 4 feet (e.g., about 1.2 m), about 5 feet (e.g., about 1.5 m), about 6 feet (e.g., about 1.8 m), or about 8 feet (e.g., about 2.4 m). Accordingly, a lateral extent 98 (e.g., extent with respect to the lateral axis 92) of the center section 86 may be about 4 feet (e.g., about 1.2 m) for a 4-foot bale, about 5 feet (e.g., about 1.5 m) for a 5-foot bale, about 6 feet (e.g., about 1.8 m) for a 6-foot bale, or about 8 feet (e.g., about 2.4 m) for an 8-foot bale, thereby enabling the center section 86 to cover the circumferential side of the bale.

Furthermore, as previously discussed, the first shoulder section 88 is configured to cover at least 5 percent of the first axial side of the bale, and the second shoulder section 90 is configured to cover at least 5 percent of the second axial side of the bale. For example, at least one shoulder section (e.g., each shoulder section) may cover 5 percent to 95 percent, 10 percent to 80 percent, 15 percent to 70 percent, or 20 percent to 60 percent of the respective axial side. In certain embodiments, a lateral extent 100 of the first shoulder section 88 is at least 10 cm, and a lateral extent 102 of the second shoulder section 90 is at least 10 cm. For example, the lateral extent of at least one shoulder section (e.g., each shoulder section) may be 10 cm to 40 cm, 15 cm to 35 cm, or 20 cm to 30 cm. In certain embodiments, the lateral extent of each shoulder section may be selected based on a diameter of the bale. Because the wrapping layer 84 covers an entirety of the circumferential side of the bale and at least a portion of each axial side of the bale, the wrapping layer 84 enhances the effectiveness of the bale wrap in maintaining the shape of the bale and provides the bale with enhanced protection from the environment (e.g., as compared to a bale wrap that only covers the circumferential side of the bale).

As previously discussed, a center stretchability of the center section 86 with respect to a longitudinal extent (e.g., longitudinal axis 104) of the wrapping layer 84 is greater than a shoulder stretchability of the first and second shoulder sections with respect to the longitudinal extent (e.g., longitudinal axis 104) of the wrapping layer 84. Accordingly, as the wrapping layer 84 is disposed about the bale, wrinkling of the shoulder sections may be reduced (e.g., as compared to a wrapping layer having uniform stretchability), thereby enhancing the effectiveness of the bale wrap in maintaining the shape of the bale and providing the bale with enhanced protection from the environment. For example, during the bale wrapping process, the center section 86 may be stretched by the bale wrapping system as the bale wrap is disposed about the bale. However, due to the lower stretchability of the shoulder sections, the shoulder sections may naturally contract about the axial sides of the bale, thereby reducing wrinkling of the shoulder sections. As a result, the shoulder sections may effectively engage the axial sides of the bale, thereby effectively maintaining the shape of the bale and blocking material (e.g., dust, water, etc.) from engaging at least a portion of the axial sides of the bale.

In certain embodiments, the center stretchability of the center section 86 enables the center section to stretch at least 10 percent with respect to the longitudinal extent (e.g., the longitudinal axis 104) of the wrapping layer 84. For example, in certain embodiments, the center stretchability of the center section may enable the center section to stretch 10 percent to 100 percent, 15 percent to 50 percent, or 20 percent to 30 percent with respect to the longitudinal extent of the wrapping layer 84. Furthermore, in certain embodiments, the shoulder stretchability of the shoulder sections may enable the shoulder sections to stretch less than 5 percent with respect to the longitudinal extent of the wrapping layer. For example, the shoulder stretchability of the shoulder sections may enable the shoulder sections to stretch 0 percent to 5 percent, 1 percent to 4 percent, or 2 percent to 3 percent with respect to the longitudinal extent of the wrapping layer. In certain embodiments, the center section and the shoulder sections may have a relatively low stretchability with respect to the lateral extent (e.g., lateral axis) of the wrapping layer (e.g., as compared to the center stretchability of the center section with respect to the longitudinal extent of the wrapping layer). For example, the lateral stretchability of the center section and the shoulder sections may be less than 5 percent, less than 4 percent, less than 3 percent, less than 2 percent, or less than 1 percent with respect to the lateral extent of the wrapping layer. As used herein, "stretchability" refers to the ability of the material to stretch without breaking fibers (e.g., without regard to returning to an original shape).

In certain embodiments, the wrapping layer 84 is formed from natural and/or biodegradable material(s), thereby reducing waste (e.g., as compared to a non-biodegradable plastic bale wrap). For example, the wrapping layer 84 may include canvas, cloth, biodegradable plastic, other suitable natural/biodegradable material(s), or a combination thereof. In certain embodiments, the wrapping layer may be formed entirely from cotton, hemp, or flax. Furthermore, in certain embodiments, the wrapping layer may be formed as a continuous layer (e.g., via a weaving process). However, in other embodiments, the shoulder sections may be formed separately from the center section and coupled to the center section (e.g., via a stitched connection, via an adhesive connection, etc.).

To establish a center section 86 with a higher longitudinal stretchability than the shoulder sections, the center section 86 may include generally longitudinally extending fibers (e.g., cotton fibers) that oscillate along the longitudinal axis 104. The magnitude of the oscillation of the generally longitudinally extending center section fibers may be greater than the magnitude and/or the frequency of the oscillation of the generally longitudinally extending shoulder section fibers (e.g., the generally longitudinally extending shoulder section fibers may extend along the longitudinal axis with no oscillation). During the bale wrapping process, the generally longitudinally extending fibers of the center section may straighten (e.g., the magnitude of oscillation may be reduced), thereby enabling the center section to stretch. The center section and the shoulder sections may also include generally laterally extending fibers (e.g., which may be straight to establish a low lateral stretchability). In certain embodiments, the center section of the wrapping layer may have fibers arranged in a gauze or double gauze pattern. While establishing the stretchability of the center section with oscillating generally longitudinally extending fibers is disclosed above, in certain embodiments, the stretchability of the center section may be established with any other suitable fibers/material(s). For example, in certain embodiments, the generally longitudinally extending fibers of the center section may have a greater individual stretchability than the generally longitudinally extending fibers of the shoulder sections.

As previously discussed, in certain embodiments, the bale wrap 42 includes a water-resistant membrane 106 coupled to the wrapping layer 84. The water-resistant membrane 106 may be positioned on an outer surface of the wrapping layer 84, such that the wrapping layer 84 contacts the bale. The water-resistant membrane is configured to block water penetration into the bale, thereby substantially protecting the bale 44 from the environmental moisture (e.g., rain, dew, etc.). For example, the water-resistant membrane 106 may be formed from an organic water-resistant material, a wax-coated material, a biodegradable plastic, etc. The water-resistant membrane 106 may be coupled to the wrapping layer 84 via an adhesive connection (e.g., an adhesive layer positioned between the wrapping layer 84 and the water-resistant membrane 106), a stitched connection, other suitable connection(s), or a combination thereof. To enable the water-resistant membrane 106 to longitudinally stretch with the center section 86 of the wrapping layer 84, the water-resistant membrane 106 may be coupled to the wrapping layer 84 in a wrinkled state (e.g. at least with respect to the longitudinal axis 104). Accordingly, as the center section 86 longitudinally stretches, the wrapping layer 84 may straighten. However, because the shoulder sections longitudinally stretch less than the center section, the water-resistant membrane may remain at least partially wrinkled on the axial sides of the bale.

In the illustrated embodiment, a lateral extent 107 (e.g., extent with respect to the lateral axis 92) of the water-resistant membrane 106 is equal to the lateral extent of the wrapping layer 84. Accordingly, the water-resistant membrane 106 covers the circumferential side of the bale and at least 5 percent of each axial side of the bale. However, in other embodiments, the lateral extent of the water-resistant membrane may be equal to the lateral extent of the center section of the wrapping layer, such that the water-resistant membrane only covers the circumferential side of the bale. While the bale wrap 42 includes the water-resistant membrane 106 in the illustrated embodiment, in other embodiments (e.g., in embodiments in which the fluid treatment is applied to the wrapping layer, in embodiments in which the bale wrap includes the particulate treatment within the wrapping layer), the water-resistant membrane may be omitted. Furthermore, in certain embodiments, a water-resistant sealant (e.g., coating, etc.) may be applied to the wrapping layer (e.g., alone or in combination with the water-resistant membrane) to block water penetration into the bale.

In the illustrated embodiment, the bale wrap 42 includes a second wrapping layer 108 coupled to the water-resistant membrane 106. The second wrapping layer 108 may be positioned on an outer surface of the water-resistant membrane 106, such that the water-resistant membrane 106 is disposed between the wrapping layers. In addition, the second wrapping layer 108 may have the same structure as the wrapping layer 84 (e.g., a center section with a higher longitudinal stretchability than the shoulder sections), the second wrapping layer 108 may have a substantially uniform structure (e.g., the center section and the shoulder sections may have the same stretchability), or the second wrapping layer may have another suitable structure. The second wrapping layer 108 may be coupled to the water-resistant membrane 106 via an adhesive connection (e.g., an adhesive layer positioned between the water-resistant membrane 106 and the second wrapping layer 108), a stitched connection, other suitable connection(s), or a combination thereof. Furthermore, a lateral extent (e.g., extent with respect to the lateral axis 92) of the second wrapping layer 108 may be equal to the lateral extent of the wrapping layer 84, or the second wrapping layer may have another suitable lateral extent.

In certain embodiments, the second wrapping layer 108 is formed from natural and/or biodegradable material(s), thereby reducing waste (e.g., as compared to a non-biodegradable plastic bale wrap). For example, the second wrapping layer 108 may include canvas, cloth, biodegradable plastic, other suitable natural/biodegradable material(s), or a combination thereof. In certain embodiments, the second wrapping layer may be formed entirely from cotton. Furthermore, in certain embodiments, the second wrapping layer may be formed as a continuous layer (e.g., via a weaving process), or the second wrapping layer may be formed from multiple sections coupled to one another (e.g., via stitched connection(s), via adhesive connection(s), etc.). In certain embodiments (e.g., in embodiments in which the water-resistant membrane is omitted), the fluid treatment or the fluid activator (e.g., in embodiments in which particulate treatment is disposed within the second wrapping layer) may be applied to the second wrapping layer. Furthermore, in embodiments in which the water-resistant membrane is omitted, the second wrapping layer may be coupled to the wrapping layer. In addition, in certain embodiments, the second wrapping layer may be omitted. In embodiments of the bale wrap having multiple layers and/or the particulate treatment, the bale wrap may be formed (e.g., manufactured) with the layers/particulate treatment before being disposed about the bale. For example, a multi-layer bale wrap (e.g., with or without the particulate treatment) may be formed into the bale wrap assembly and disposed within the baling chamber to facilitate the bale wrapping process.

Figure 4:
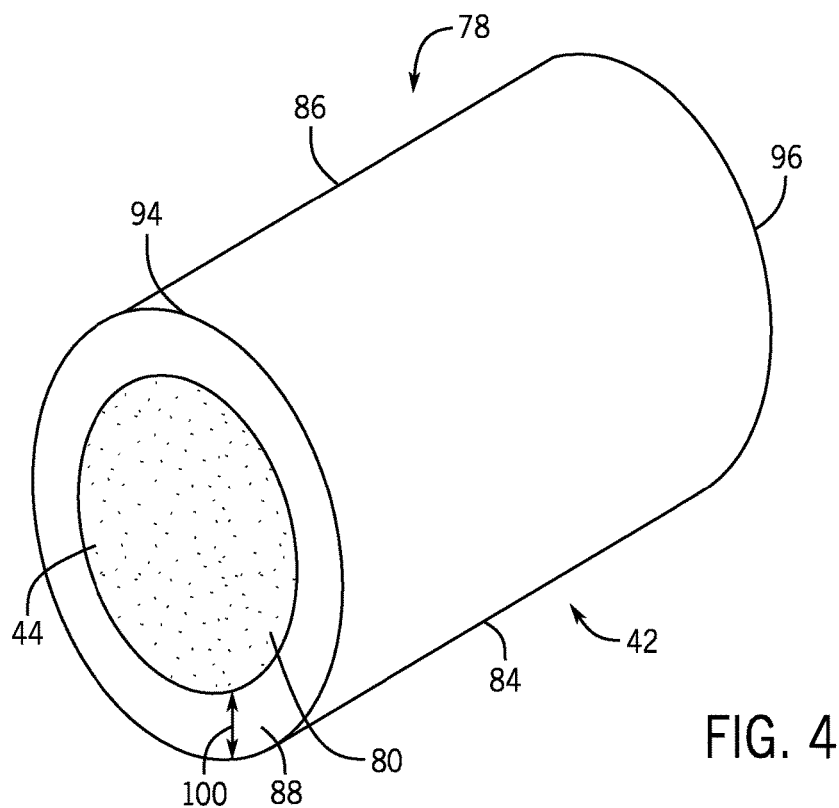
FIG. 4 is a perspective view of an embodiment of a bale wrap disposed about a bale.

FIG. 4 is a perspective view of an embodiment of a bale wrap 42 disposed about a bale 44. In the illustrated embodiment, the bale wrap 42 includes a single layer corresponding to the wrapping layer 84. As previously discussed, the wrapping layer 84 includes the center section 86, the first shoulder section 88, and the second shoulder section. The first shoulder section 88 extends laterally outwardly from the first lateral side 94 of the center section 86, and the second shoulder section extends laterally outwardly from the second lateral side 96 of the center section 88. Accordingly, the center section 86 is positioned between the first and second shoulder sections with respect to the lateral extent of the wrapping layer 84. Furthermore, the center section 86 is configured to cover the circumferential side 78 of the bale 44, the first shoulder section 88 is configured to cover at least 5 percent of the first axial side 80 of the bale 44, and the second shoulder section is configured to cover at least 5 percent of the second axial side of the bale 44. Accordingly, the bale wrap 42 covers an entirety of the circumferential side 78 of the bale 44 and at least a portion of each axial side of the bale 44, thereby enhancing the effectiveness of the bale wrap 42 in maintaining the shape of the bale 44 and providing the bale 44 with enhanced protection from the environment (e.g., as compared to a bale wrap that only covers the circumferential side of the bale).

In addition, as previously discussed, the center stretchability of the center section 86 with respect to the longitudinal extent of the wrapping layer 84 is greater than the shoulder stretchability of the first and second shoulder sections with respect to the longitudinal extent of the wrapping layer. Accordingly, with the wrapping layer 84 disposed about the bale 44, wrinkling of the shoulder sections may be reduced (e.g., as compared to a wrapping layer having uniform stretchability), thereby further enhancing the effectiveness of the bale wrap 42 in maintaining the shape of the bale 44 and providing the bale with enhanced protection from the environment. For example, during the bale wrapping process, the center section 86 may be stretched by the bale wrapping system as the bale wrap 42 is disposed about the bale 44. However, due to the lower stretchability of the shoulder sections, the shoulder sections may naturally contract about the axial sides of the bale, thereby reducing wrinkling of the shoulder sections. As a result, the shoulder sections may effectively engage the axial sides of the bale 44, thereby effectively maintaining the shape of the bale 44 and blocking material (e.g., dust, water, etc.) from engaging at least a portion of the axial sides of the bale 44.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A bale wrap for an agricultural bale, comprising:
a wrapping layer having a center section, a first shoulder section, and a second shoulder section, wherein the first shoulder section extends laterally outwardly from a first lateral side of the center section, the second shoulder section extends laterally outwardly from a second lateral side of the center section, the center section is configured to cover a circumferential side of the agricultural bale, the first shoulder section is configured to cover at least 5 percent of a first axial side of the agricultural bale, the second shoulder section is configured to cover at least 5 percent of a second axial side of the agricultural bale, and a center stretchability of the center section with respect to a longitudinal extent of the wrapping layer is greater than a shoulder stretchability of the first and second shoulder sections with respect to the longitudinal extent of the wrapping layer.

2. The bale wrap of claim 1, wherein the wrapping layer is formed from one or more natural materials.

3. The bale wrap of claim 2, wherein the wrapping layer is formed entirely from cotton, hemp, or flax.

4. The bale wrap of claim 1, wherein the center stretchability of the center section enables the center section to stretch at least 10 percent with respect to the longitudinal extent of the wrapping layer.

5. The bale wrap of claim 1, wherein a lateral extent of the first shoulder section is at least 10 cm, and a lateral extent of the second shoulder section is at least 10 cm.

6. The bale wrap of claim 1, comprising a water-resistant membrane coupled to the wrapping layer, wherein the water-resistant membrane is configured to block water penetration into the agricultural bale.

7. The bale wrap of claim 6, comprising a second wrapping layer coupled to the water-resistant membrane.

8. The bale wrap of claim 1, comprising a particulate treatment within the wrapping layer, wherein the particulate treatment is configured to be activated by a fluid activator, and the activated particulate treatment is configured to block water penetration into the agricultural bale.

9. A method for wrapping an agricultural bale, comprising:
disposing a bale wrap about the agricultural bale, wherein the bale wrap comprises a wrapping layer having a center section, a first shoulder section, and a second shoulder section, the first shoulder section extends laterally outwardly from a first lateral side of the center section, the second shoulder section extends laterally outwardly from a second lateral side of the center section, the center section is configured to cover a circumferential side of the agricultural bale, the first shoulder section is configured to cover at least 5 percent of a first axial side of the agricultural bale, the second shoulder section is configured to cover at least 5 percent of a second axial side of the agricultural bale, and a center stretchability of the center section with respect to a longitudinal extent of the wrapping layer is greater than a shoulder stretchability of the first and second shoulder sections with respect to the longitudinal extent of the wrapping layer;

wherein disposing the bale wrap about the agricultural bale comprises stretching the center section of the wrapping layer as the bale wrap is disposed about the agricultural bale.

10. The method of claim 9, comprising applying a fluid treatment or a fluid activator to the wrapping layer after the bale wrap is disposed about the agricultural bale, wherein the fluid treatment is configured to block water penetration into the agricultural bale, the fluid activator is configured to activate a particulate treatment within the wrapping layer, and the activated particulate treatment is configured to block water penetration into the agricultural bale.

11. The method of claim 9, wherein the center stretchability of the center section enables the center section to stretch at least 10 percent with respect to the longitudinal extent of the wrapping layer.

12. The method of claim 9, wherein a lateral extent of the first shoulder section is at least 10 cm, and a lateral extent of the second shoulder section is at least 10 cm.

13. The method of claim 9, wherein the bale wrap comprises a water-resistant membrane coupled to the wrapping layer, and the water-resistant membrane is configured to block water penetration into the agricultural bale.

14. The method of claim 13, comprising a second wrapping layer coupled to the water-resistant membrane.

15. The method of claim 9, wherein the wrapping layer is formed from one or more natural materials.

16. A baler, comprising:
a belt configured to rotate within a bale chamber to form an agricultural bale within the bale chamber; and
a bale wrapping system configured to wrap the agricultural bale with a bale wrap, wherein the bale wrapping system comprises a bale wrap assembly configured to feed the bale wrap between the agricultural bale and the belt after the agricultural bale is formed, wherein the bale wrap comprises a wrapping layer having a center section, a first shoulder section, and a second shoulder section, wherein the first shoulder section extends laterally outwardly from a first lateral side of the center section, the second shoulder section extends laterally outwardly from a second lateral side of the center section, the center section is configured to cover a circumferential side of the agricultural bale, the first shoulder section is configured to cover at least 5 percent of a first axial side of the agricultural bale, the second shoulder section is configured to cover at least 5 percent of a second axial side of the agricultural bale, and a center stretchability of the center section with respect to a longitudinal extent of the wrapping layer is greater than a shoulder stretchability of the first and second shoulder sections with respect to the longitudinal extent of the wrapping layer.

17. The baler of claim 16, comprising a controller having a memory and a processor, wherein the belt is configured to drive the agricultural bale to rotate while the bale wrap assembly is feeding the bale wrap, and the controller is configured to control a belt speed of the belt and a roll speed of a shaft of the bale wrap assembly to stretch the center section of the wrapping layer while the bale wrap assembly is feeding the bale wrap.

18. The baler of claim 16, wherein the bale wrapping system comprises a fluid applicator configured to apply a fluid treatment or a fluid activator to the wrapping layer after the bale wrap is disposed about the agricultural bale, the fluid treatment is configured to block water penetration into the agricultural bale, the fluid activator is configured to activate a particulate treatment within the wrapping layer, and the activated particulate treatment is configured to block water penetration into the agricultural bale.

19. The baler of claim 16, wherein the wrapping layer is formed from one or more natural materials.

20. The baler of claim 16, wherein a lateral extent of the first shoulder is at least 10 cm, and a lateral extent of the second shoulder is at least 10 cm.

\* \* \* \* \*